UNITED STATES PATENT OFFICE.

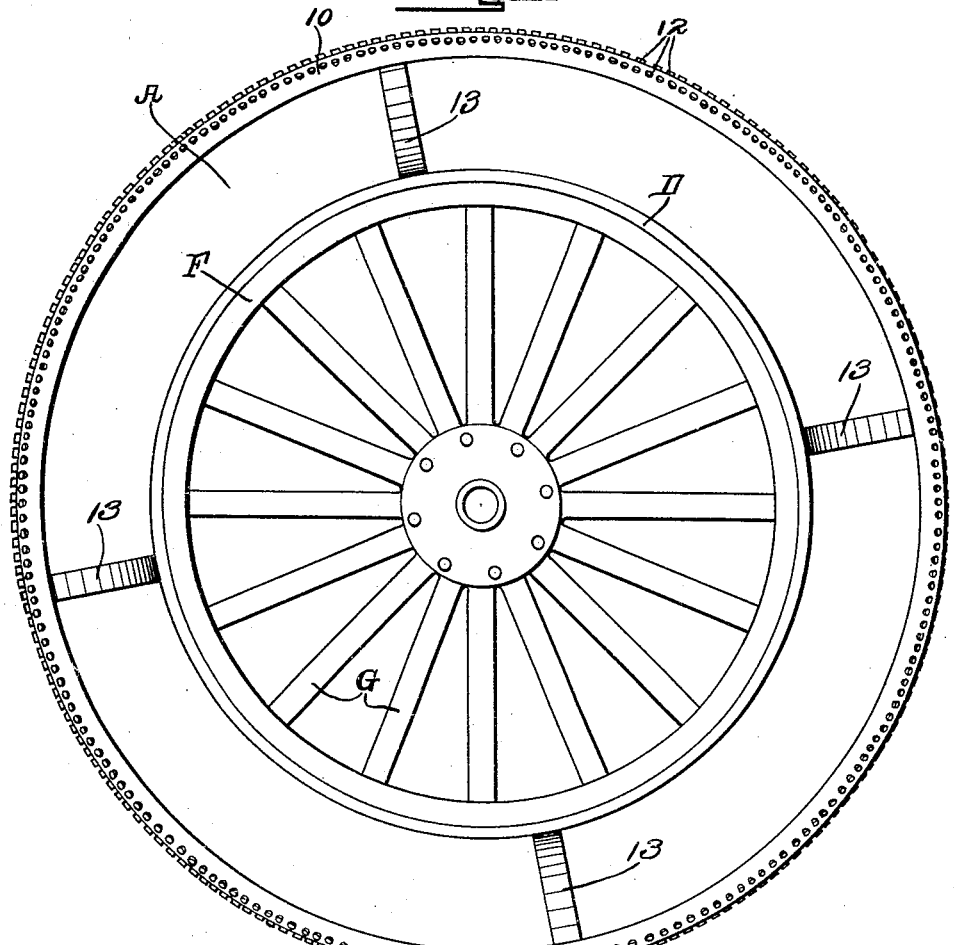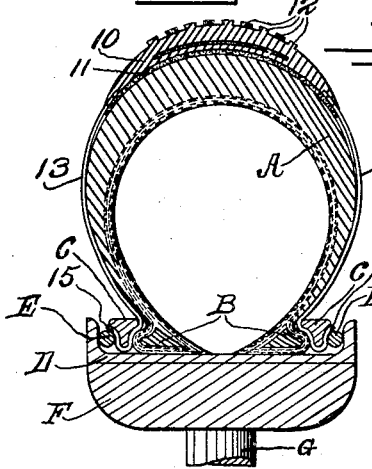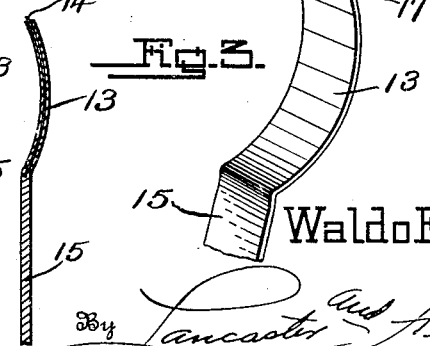

WALDO E. NILES, OF NORTH ABINGTON, MASSACHUSETTS.

TIRE-PROTECTOR.

1,328,539.  Specification of Letters Patent.  Patented Jan. 20, 1920.

Application filed November 14, 1917. Serial No. 201,928.

*To all whom it may concern:*

Be it known that I, WALDO E. NILES, a citizen of the United States, residing at North Abington, county of Plymouth, and State of Massachusetts, have invented certain new and useful Improvements in Tire-Protectors, of which the following is a specification.

The present invention relates to tires for carrier wheels and the like, and has more particular reference to an improved tread attachment for application to the tire.

The object of the present invention is to provide a tread attachment which may be quickly and easily applied and removed relatively to a tire; a tread attachment which serves as a protector for tires of the pneumatic type; to provide an improved means for securing the tread to the tire; to provide an improved securing means which is adapted to interlock with the tire securing devices at present commonly employed; and to provide a tire protector which conforms to the general contour of the tire and does not materially increase the size thereof.

The above and other objects and advantages of this invention will be in part described and in part understood from the following detailed description of the present preferred embodiment, the same being illustrated in the accompanying drawing, wherein:

Figure 1 is a side elevation of a tire protector constructed according to the present invention, and as applied to a pneumatic tire mounted on a common wheel structure.

Fig. 2 is a transverse section taken through the protector as applied to the tire and wheel.

Fig. 3 is a detail perspective view of one of the securing elements employed.

Fig. 4 is a longitudinal section through the same, parts being broken away.

For the purpose of illustration the protector of this invention is shown as applied to the casing A of a pneumatic tire of the usual type and which is provided with retaining beads B at its free edges adapted to seat beneath quick detachable rings C mounted upon the felly band D. The rim D is provided with a locking ring E employed in the usual manner for detachably holding the outermost ring C in place on the rim D.

The rim D is mounted upon the usual felly F supported upon the spokes G of an ordinary wheel body.

The protector comprises an annular relatively flat strip or body portion 10 of rubber, or any suitable composition having embedded therein a number of layers 11 of canvas or other suitable reinforcing material. The body 10 with its reinforcement 11 is vulcanized into a homogeneous mass similar to the construction of tire casings, and the body 10 is formed of substantial thickness intermediate its edges and is gradually tapered or reduced in thickness toward said edges. The annular body 10 is adapted to lie against the tread portion of the casing A, and the tapering edges of the body part 10 gradually merge into the general contour or outlines of the tire. As shown in the present instance, the body 10 of the tread may be provided with anti-skid projections 12 to form a roughened surface for the tread.

For detachably securing the tread body 10 to the tire, a plurality of preferably stiff straps 13 are employed and arranged in pairs at opposite sides of the body 10 and adapted to extend radially inward against the opposite sides of the casing A. Each strap 13 is preferably formed with an inner or body part 14 of sheet metal or the like which is resilient, and which is curved to conform substantially to the curvature of the side of the tire. The sheet metal strip 14 is inclosed in a rubber or other suitable covering to prevent frictional contact between the metal strip and the tire, and the covering is projected beyond the inner end of the strip 14 and forms a flexible tongue 15 adapted to engage about the adjacent retaining ring C of the rim structure. The flexible tongues 15 afford a quick and easily handled means for securing the protector to the tire, and for firmly and securely retaining the protector in place.

The protector of this invention may of course be used with tires of various types, and is adapted particularly for use with smooth tread tires, and may be used continuously with the same to serve not only as a reinforcement for the tire, but also as an anti-skid tread therefor.

The device may be readily applied and removed with respect to the tire as the tongues 15 are engaged or disengaged with the retaining rings C when the latter are positioned or removed upon the ring or felly band D.

It is of course understood that various changes and modifications may be made in the details of construction of the foregoing embodiment of the present invention without departing from the spirit thereof, such changes and modifications being restricted only by the scope of the following claims.

I claim:

1. In a tire protector, the combination of a flexible annular body portion, metallic strips secured to the body portion and projecting laterally from the same, a covering for each strip projecting beyond the free end of the same and forming a flexible tongue adapted to be secured against the bead of a tire for holding the protector in place.

2. In a tire protector, the combination of a tire armor, metal strips embedded at one end in the armor and projecting edgewise therefrom in opposite direction for engagement against the opposite sides of a tire to secure the armor against the tread of the tire, a flexible covering for each of said metal strips to prevent contact of the strips with a tire, said covering projecting beyond the inner ends of the strips to form flexible tongues adapted to be secured against the bead of a tire for holding the protector in place.

WALDO E. NILES.